(12) United States Patent
Schaak (10) Patent No.: US 11,365,855 B1
(45) Date of Patent: Jun. 21, 2022

(54) LIGHTING ASSEMBLY HAVING MOTION EFFECTS

(71) Applicant: Lee Schaak, Dix Hills, NY (US)

(72) Inventor: Lee Schaak, Dix Hills, NY (US)

(73) Assignee: Adesso Inc., New York, NY (US)

( * ) Notice: Subject to any disclaimer, the term of this patent is extended or adjusted under 35 U.S.C. 154(b) by 0 days.

(21) Appl. No.: 17/337,735

(22) Filed: Jun. 3, 2021

(51) Int. Cl.
*F21S 10/00* (2006.01)
*F21V 8/00* (2006.01)

(52) U.S. Cl.
CPC ............ *F21S 10/005* (2013.01); *G02B 6/006* (2013.01); *G02B 6/0076* (2013.01); *G02B 6/0083* (2013.01)

(58) Field of Classification Search
CPC ..... F21S 10/005; G02B 6/006; G02B 6/0076; G02B 6/0083
See application file for complete search history.

(56) References Cited

U.S. PATENT DOCUMENTS

| | | |
|---|---|---|
| 3,387,396 A | 6/1968 | Smith |
| 4,034,493 A | 7/1977 | Ball |
| 4,196,899 A | 4/1980 | Patterson |
| 5,124,890 A * | 6/1992 | Choi .................. G02B 6/0026 362/23.01 |
| 5,778,576 A | 7/1998 | Kaviani |
| 5,803,580 A | 9/1998 | Tseng |
| D408,092 S | 4/1999 | Schaak |
| D408,568 S | 4/1999 | Schaak |
| D409,779 S | 5/1999 | Schaak et al. |
| D411,024 S | 6/1999 | Schaak et al. |
| D411,026 S | 6/1999 | Schaak et al. |
| D411,638 S | 6/1999 | Schaak et al. |
| 5,980,071 A | 11/1999 | Hsieh |
| 6,004,012 A | 12/1999 | Hsieh |
| 6,065,850 A | 5/2000 | Chiu |
| 6,135,604 A | 10/2000 | Lin |
| 6,193,378 B1 | 2/2001 | Tonar et al. |
| 6,203,178 B1 | 3/2001 | Hsieh |
| 6,239,898 B1 | 5/2001 | Byker et al. |
| 6,308,444 B1 * | 10/2001 | Ki ..................... G02B 6/0036 40/546 |
| 6,447,138 B1 | 9/2002 | Yang |
| 6,604,835 B2 | 8/2003 | Zale |
| 6,681,508 B2 | 1/2004 | Unger et al. |
| 6,816,297 B1 | 11/2004 | Tonar et al. |
| 6,886,403 B2 | 5/2005 | LaBarge et al. |
| 6,979,097 B2 | 12/2005 | Elam et al. |
| 7,024,809 B1 * | 4/2006 | Poma ..................... G02B 6/006 264/400 |
| D550,892 S | 9/2007 | Schaak et al. |
| 7,793,448 B1 * | 9/2010 | Huang ................... G09F 13/18 40/546 |

(Continued)

FOREIGN PATENT DOCUMENTS

ES 2796563 4/2020

*Primary Examiner* — Zheng Song
(74) *Attorney, Agent, or Firm* — King & Partners, PLC (57) ABSTRACT

A lighting assembly adapted for placement upon an article of furniture and/or securement to a wall, including: a frame/housing sub-assembly; an electronics sub-assembly; and a display sub-assembly, wherein the display sub-assembly comprises a first substrate, a second substrate, and a third substrate, wherein the substrates cooperatively interact to provide one or more lighted motion effects.

11 Claims, 9 Drawing Sheets

(56) References Cited

U.S. PATENT DOCUMENTS

| | | |
|---|---|---|
| D629,964 S | 12/2010 | Schaak |
| 7,847,486 B2 | 12/2010 | Ng |
| 8,294,389 B2 | 10/2012 | Finkle |
| RE44,373 E | 7/2013 | Hsieh et al. |
| 8,628,209 B2 | 1/2014 | Shew |
| 8,695,247 B1 | 4/2014 | Yang |
| D704,377 S | 5/2014 | Schaak |
| 8,899,797 B2 | 12/2014 | Schaak |
| 8,956,013 B1 | 2/2015 | Shew |
| D767,189 S | 9/2016 | Schaak |
| 9,759,391 B1 | 9/2017 | Shew |
| 10,161,605 B2 | 12/2018 | May |
| 10,598,323 B1 | 3/2020 | Schaak |
| 2003/0179564 A1* | 9/2003 | Ganci .................... G02B 6/006 362/616 |
| 2003/0184990 A1* | 10/2003 | Lin ...................... G02B 6/0076 362/616 |
| 2004/0221500 A1 | 11/2004 | Schaak et al. |
| 2004/0221501 A1 | 11/2004 | Schaak et al. |
| 2006/0072327 A1 | 4/2006 | Schaak |
| 2006/0077672 A1 | 4/2006 | Schaak |
| 2006/0092635 A1 | 5/2006 | Schaak et al. |
| 2006/0209530 A1 | 9/2006 | Schaak |
| 2006/0291217 A1 | 12/2006 | Vanderschuit |
| 2009/0185389 A1* | 7/2009 | Tessnow .............. G02B 6/0076 362/516 |
| 2009/0219734 A1* | 9/2009 | Sawada ................ G02B 6/0076 362/616 |
| 2009/0255155 A1 | 10/2009 | James et al. |
| 2011/0163672 A1 | 7/2011 | Shew et al. |
| 2012/0113155 A1* | 5/2012 | Fang .................... G02B 6/0055 362/97.1 |
| 2013/0033195 A1 | 2/2013 | Liao |
| 2013/0099698 A1 | 4/2013 | Podd |
| 2013/0322097 A1 | 12/2013 | Schaak |
| 2016/0054513 A1* | 2/2016 | Wang .................... G02B 6/006 362/605 |
| 2016/0320550 A1* | 11/2016 | Tsai .................... G02B 6/0091 |
| 2018/0267230 A1* | 9/2018 | Takagi ................ G02F 1/0105 |
| 2019/0249838 A1* | 8/2019 | Wang .................. G02B 6/0091 |

* cited by examiner

LIGHTING ASSEMBLY HAVING MOTION EFFECTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to lighting assemblies, and, more particularly, to lighting assemblies adapted for placement upon an article of furniture and/or securement to a wall having a primary light source (e.g., a light emitting diode (LED)), a secondary light source, and a tertiary light source that collectively provide one or more lighted motion effects. The lighting assemblies of the present invention preferably operate in at least four modes, namely: (1) an off mode; and (2) three on modes, wherein during the on modes a plurality of substrates (e.g., panels, sheets, etcetera) are repeatedly sequenced to display a motion effect to an observer. Non-limiting examples of motion effects include, for example, a firework exploding, a champagne bottle overflowing, a fist bump, and a sporting activity—just to name few. The lighting assemblies of the present invention provide novel structures, functionality and distinctive motion effects.

2. Background Art

Lighting assemblies have been known in the art for years and are the subject of a plurality of patents and publications, including: U.S. Pat. No. 10,161,605 entitled "Lighting Assembly," U.S. Pat. No. 9,759,391 entitled "LED Light Fixture Assembly," U.S. Pat. No. 8,956,013 entitled "LED Light Troffer/Fixture Assembly," U.S. Pat. No. 8,628,209 entitled "Light Assembly," U.S. Pat. No. 7,847,486 entitled "LED Lighting System," U.S. Pat. No. 6,979,097 entitled "Modular Ambient Lighting System," United States Patent Application Publication Number 2013/0099698 entitled "Lighting Device," United States Patent Application Publication Number 2013/0033195 entitled "Light Source Apparatus," United States Patent Application Publication Number 2011/0163672 entitled "Light Assembly," and Spanish Patent Application Publication Number 2,796,563 entitled "Lighting Device"—all of which are hereby incorporated herein by reference in their entirety including all references cited therein.

U.S. Pat. No. 10,161,605 appears to disclose an elongate tubular lighting assembly having a body with a length between spaced first and second ends. The tubular lighting assembly has a source of illumination and first and second connectors respectively at the first and second body ends. The first connector has cooperating first and second parts having first and second surfaces. The first and second connector parts are configured so that the first and second surfaces are placed in confronting relationship to prevent separation of the first and second connector parts with the body in an operative state as an incident of the first connector part moving relative to the second connector part from a position fully separated from the second connector part in a substantially straight path that is transverse to the length of the body into an engaged position.

U.S. Pat. No. 9,759,391 appears to disclose a light assembly that contains a housing. One or more LED light units are contained within the housing, wherein each of the LED light units may contain only one corresponding conductive end cap. A pair of conductors extending from each of the corresponding conductive end caps are mated with a corresponding socket contained within a DC power supply module contained within the housing.

U.S. Pat. No. 8,956,013 appears to disclose a light assembly that contains a troffer having a housing. One or more LED light units are contained within the troffer, wherein each one of the LED light units contains only one corresponding conductive end cap. A pair of conductors extending from each of the corresponding conductive end caps are mated with a corresponding socket contained within a DC power supply module contained within the troffer.

U.S. Pat. No. 8,628,209 appears to disclose a light assembly that includes a housing containing at least one solid-state lighting device. The solid-state lighting device electrically communicates with an AC energy source in a known manner. At least one photovoltaic cell is connected to an inner wall of the housing adjacent to the solid-state lighting device whereby the photovoltaic cell absorbs radiative energy from the solid-state lighting device. At least one battery pack derives energy from the artificial light of the lighting device, by and through the photovoltaic cell. One or more LED lights, or an LED array, are contained within the housing, and electronically communicate with the battery pack. An actuation sensor activates a switching means to energize the LED light(s) with DC power from the battery pack.

U.S. Pat. No. 7,847,486 appears to disclose a lighting system that has an array of at least one light-emitting solid-state element such as a light-emitting diode (LED) or a laser diode. A voltage source, which may supply either alternating or direct current, energizes the array. Array state circuitry, electrically connected in series with the array, senses at least one state of the array, such as the amount of current passing through the array, or temperature. Secondary circuitry is connected in parallel with the array. A switching component that adjusts the current passing through the secondary circuitry in accordance with the sensed state of the array such that current through the array is maintained substantially constant. A third, parallel, excess current shunt path may also be provided, in which case so is excess current shunt circuitry, which senses current flowing in the secondary circuitry and shunts current in the secondary circuitry in excess of an excess current threshold to the excess current shunt path, whereby overflow current above a first threshold for the array is shunted away from the array and excess current above a second threshold is shunted from the secondary circuits to the excess current shunt circuitry. A wide-angle mounting arrangement is also provided for the array.

U.S. Pat. No. 6,979,097 appears to disclose a modular ambient lighting system for providing lighting to the interior of a building. The system features three separate modules: (1) a support module, (2) a power module, and (3) a light fixture body module. The support module provides an electrical connection to the building and structural connection to the ceiling of the building. An interchangeable power module fits into a recess or "foot print" in the support module. The power module includes the electrical components of the lighting system (e.g., ballast, transformer, emergency batteries, etcetera). An interchangeable light fixture body module houses the lamp that can be configured to deliver direct, indirect, or direct/indirect illumination. The interchangeable features of the modules offer superior flexibility because of the ease to reconfigure the electrical operation of the light system, the type illumination delivered, or the aesthetics of the light system.

United States Patent Application Publication Number 2013/0099698 appears to disclose a light film apparatus having an illuminated graphics panel with at least two segments that can be individually powered. A controller manages a power which is delivered from a power supply to each of the segments, so that each of the segments is either powered on, powered off or powered to an intermediate level. With the independent control of power to the different segments, it is possible to create a three-dimensional appearance of a moving image from a generally two-dimensional panel arrangement. A housing can be mounted so that the graphics panel abuts or is closely mounted to a mounting surface.

United States Patent Application Publication Number 2013/0033195 appears to disclose a light source apparatus that includes at least a light-emitting module. The light-emitting module includes a hollow rod-shaped base and a plurality of LED chips. The hollow rod-shaped base has an outer surface and an inner surface opposite to the outer surface, in which the inner surface surrounds a space. The LED chips are disposed in flip chip bonding way on the outer surface of the hollow rod-shaped base, in which the LED chips are disposed surrounding the space.

United States Patent Application Publication Number 2011/0163672 appears to disclose an LED lighting assembly containing: a housing; one or more solid state lighting units contained within the housing and actuated by alternating current power; a night light contained within the housing and operably communicating with the solid state lighting units, the night light actuated by direct current power in the absence of light from the solid state lighting units; one or more light emitting diodes contained within the night light; and a battery source for powering the night light in the event of power interruption. The '672 reference appears to further disclose a lighting unit containing: a housing or elongated tube; one or more light emitting diodes contained within the housing or elongated tube, and a battery source contained within the housing or elongated tube, the battery source is configured to selectively power the light emitting diodes with direct current energy.

Spanish Patent Application Publication Number 2,796, 563 appears to disclose an illumination device comprising a housing, a base, a solid-state light source, and an optical means, wherein the solid-state light source is optically coupled to the optical medium, where the optical medium is an element within the lighting device separate from and not integrated in the envelope, where the optical medium is provided with a light decoupling surface that allows the light to be decoupled from the optical medium by means of a roughness of the optical medium surface, characterized in that the optical medium comprises an optical fiber, where the surface roughness is provided along the fiber so that the emission along the fiber resembles the emission from a carbon filament lamp.

While the above-identified patents and publications do appear to disclose various lighting assemblies, their configurations remain non-desirous and/or problematic inasmuch as, among other things, none of the above-identified lighting assemblies cooperatively interact to provide one or more lighted motion effects. The prior art is also devoid of the novel structures and functionality provided by the lighting assemblies of the present invention.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a lighting assembly adapted for placement upon an article of furniture and/or securement to a wall, comprising, consisting essentially of, and/or consisting of: (a) a frame or housing sub-assembly, wherein the frame or housing sub-assembly comprises: (1) at least one sidewall having an inner surface and an outer surface; (2) a top wall having an inner surface and an outer surface; (3) a bottom wall having an inner surface and an outer surface; and (4) wherein the at least one sidewall, the top wall, and the bottom wall are in a spaced-apart relationship to define an internal chamber therebetween; (b) an electronics sub-assembly, wherein the electronics sub-assembly comprises: (1) an energy source; (2) a circuit board; and (3) a primary light source, a secondary light source, and a tertiary light source; and (c) a display sub-assembly, wherein the display sub-assembly comprises a first substrate, a second substrate, and a third substrate, wherein the substrates cooperatively interact to provide one or more lighted motion effects.

In a preferred embodiment of the present invention, the lighting assembly operates in an off mode and a three-part on mode, wherein when in an off mode the primary light source, the secondary light source, and the tertiary light source are off, wherein when in a first-on mode the primary light source is on and the secondary and tertiary light sources are off, wherein when in a second-on mode the primary and tertiary light sources are off and the secondary light source is on, and wherein when in a third-on mode the primary and secondary light sources are off and the tertiary light source is on.

In another preferred embodiment of the present invention, the at least one sidewall of the housing sub-assembly comprises a front sidewall, a rear sidewall, a left sidewall, and a right sidewall.

In yet another preferred embodiment of the present invention, the housing sub-assembly comprises the geometry of at least one of a cube, a cuboid, a tetrahedron, a pyramid, a square pyramid, a hexagonal pyramid, a prism, a triangular prism, a pentagonal prism, a hexagonal prism, an octahedron, a dodecahedron, an icosahedron, a cylinder, a cone, a polygon, a sphere, and an ellipsoid.

In one preferred embodiment of the present invention, the energy source of the electronics sub-assembly comprises at least one of an AC power supply, a DC power supply, an AC-DC power supply, a primary electrochemical cell, a secondary electrochemical cell, and a fuel cell.

In a preferred embodiment of the present invention, the circuit board of the electronics sub-assembly comprises at least one of a battery, a bridge rectifier, a capacitor, a central processing unit, a communications port, a control board, a crystal, a diode, a fuse, a graphics board, an inductor, an input port, an integrated circuit, a microprocessor, a memory module, an oscillator, an output port, a potentiometer, a receiver, a relay, a resistor, a semiconductor, a transformer, a timer, a transistor, a tuner, a video processing unit, a wired communications hub, and a wireless communications hub.

In another preferred embodiment of the present invention, the display sub-assembly comprises: a first substantially transparent substrate having an outer surface and an inner surface; a second substantially transparent substrate having an outer surface and an inner surface; a third substantially transparent substrate having an outer surface and an inner surface; and wherein at least a portion of the inner and/or outer surfaces of each one of the first, second, and third substrates are etched so as to provide one or more lighted motion effects.

In yet another preferred embodiment of the present invention, the primary, secondary, and tertiary light sources independently comprise at least one of a light-emitting diode, an organic light-emitting diode, a tri-color (RGB) light-emitting diode, an incandescent bulb, a tungsten-halogen bulb, a xenon bulb, a fluorescent bulb, a compact fluorescent lamp, a high-intensity discharge bulb, and an electroconductive, lightable paint/material.

In one preferred embodiment of the present invention, the energy source is at least partially contained within the internal chamber of the housing sub-assembly, and wherein the energy source is in electrical communication with at least one of the circuit board, the primary light source, the secondary light source, and the tertiary light source.

In a preferred embodiment of the present invention, the circuit board is at least partially contained within the internal chamber of the housing sub-assembly, and wherein the circuit board is in electrical communication with at least one of the energy source, the primary light source, the secondary light source, and the tertiary light source.

In another preferred embodiment of the present invention, the primary light source, the secondary light source, and the tertiary light source are at least partially contained within the internal chamber of the housing sub-assembly, and wherein the primary light source, the secondary light source, and the tertiary light source are in electrical communication with at least one of the energy source and the circuit board.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Figure 9:
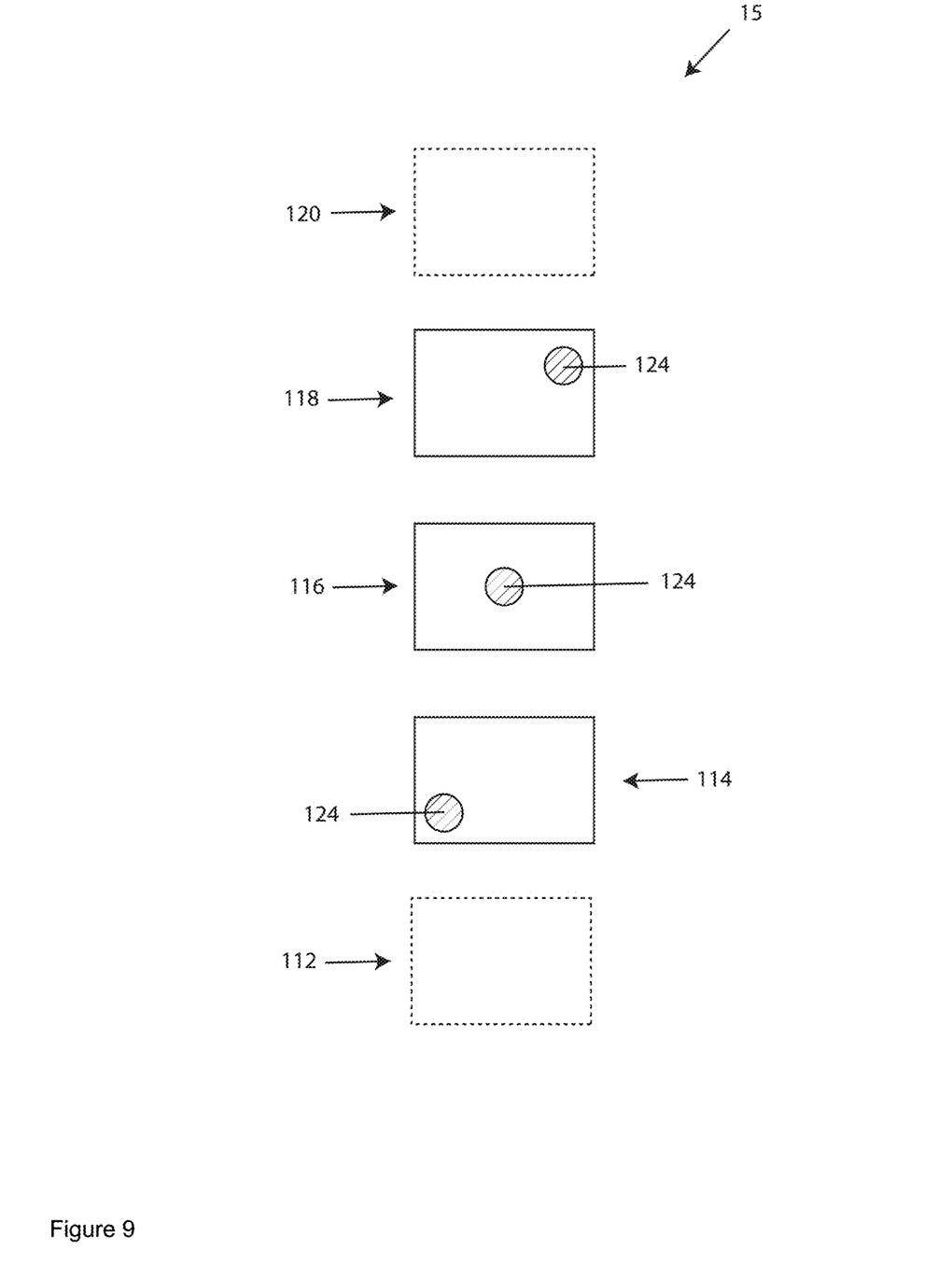
FIG. 9 of the drawings is a schematic representation of a display sub-assembly, in accordance with the present invention, showing substrates having surface etching to provide lighted motion effects.

Referring now to the drawings, and to FIGS. 1-6 in particular, lighting assembly 10 is shown as generally comprising containment, housing, and/or frame sub-assembly 12, electronics sub-assembly 14, and display sub-assembly 15. Lighting assembly 10 is preferably adapted for placement upon an article of furniture (e.g., desk, dresser, nightstand, table, etcetera) and/or securement to a wall. The lighting assemblies of the present invention utilize light sources and substrates that cooperatively interact to provide one or more lighted motion effects. The lighting assemblies of the present invention preferably utilize four distinct modes, namely: a first mode, where all light sources are off; a first-on mode, where the primary light source is on and the secondary and tertiary light sources are off (See FIG. 4); a second-on mode, where the primary and tertiary light sources are off and the secondary light source is on (See FIG. 5); and a third-on mode, where the primary and secondary light sources are off and the tertiary light source is on (See FIG. 6). In accordance with the present invention, the on modes are repeatedly sequenced to display a motion effect to an observer—similar to a cartoon or movie. As is shown in FIG. 9, the etched portions of the substrates provide the reflective elements to generate the motion effect.

Figure 3:
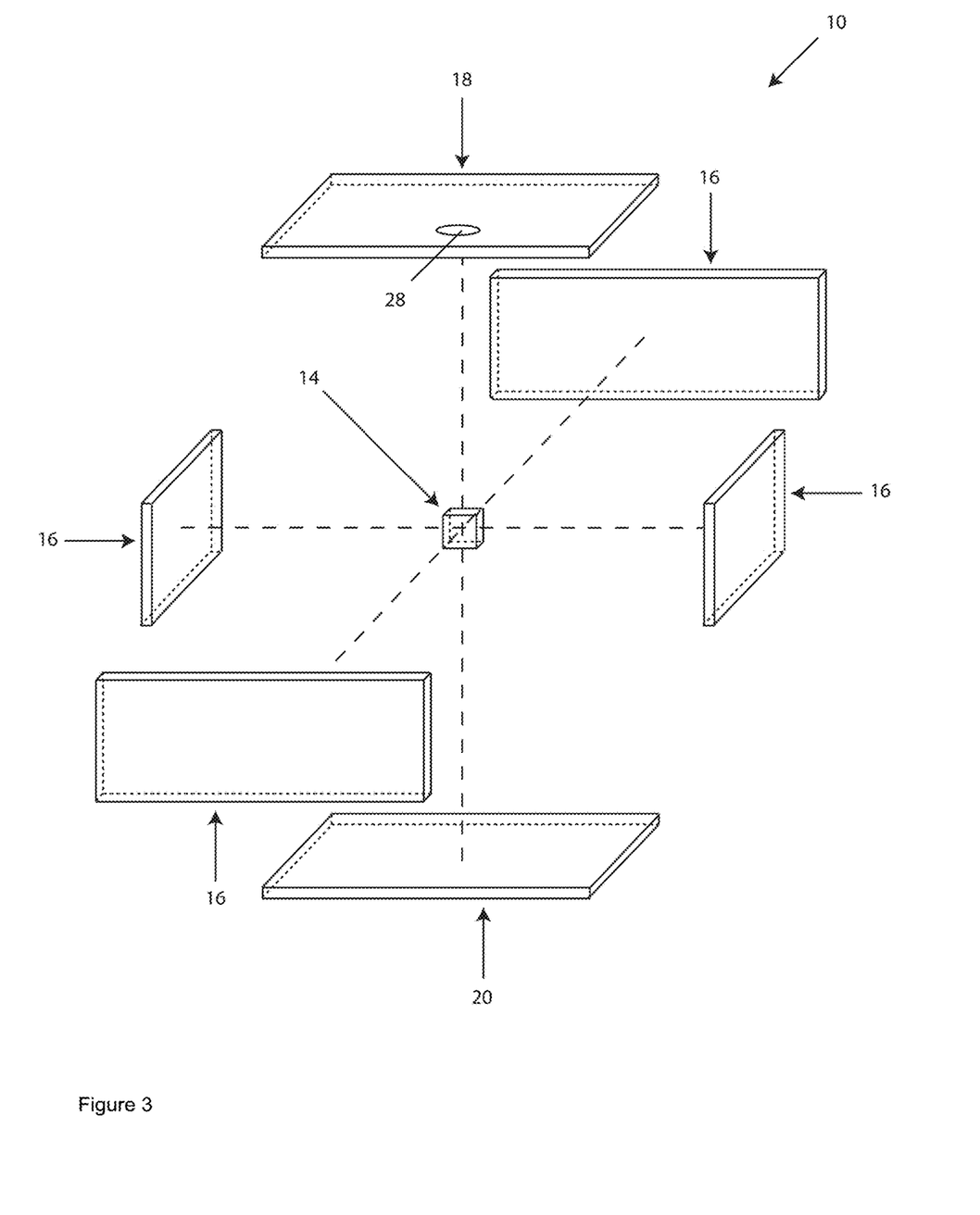
FIG. 3 of the drawings is a fragmented, exploded perspective view of a lighting assembly, in accordance with the present invention, showing a containment sub-assembly or housing and a representation of an electronics sub-assembly.
Figure 4:
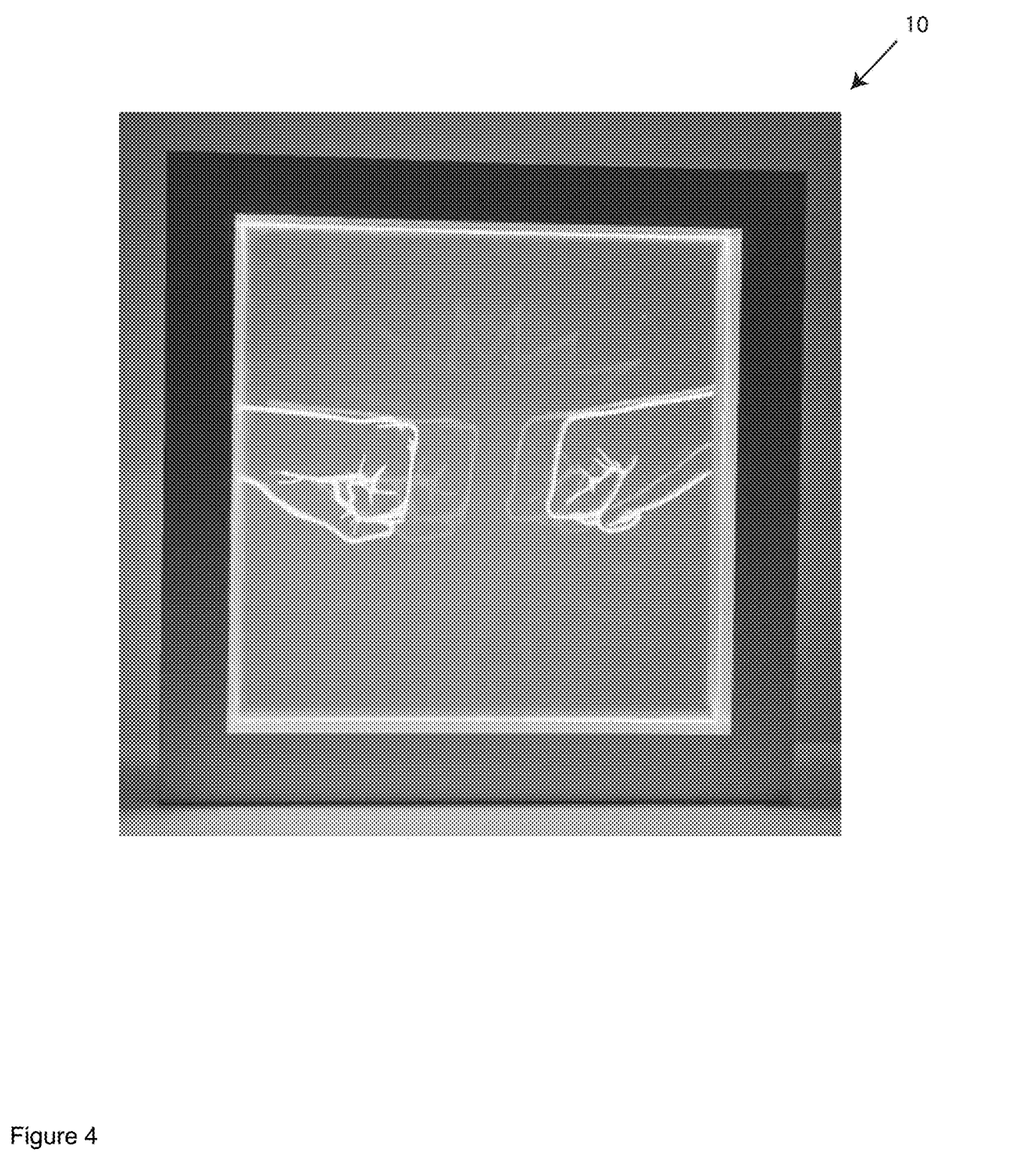
FIG. 4 of the drawings is a perspective view of a lighting assembly, in accordance with the present invention, shown in a first-on position ($1^{st}$ substrate illumination only by a primary light source)
Figure 5:
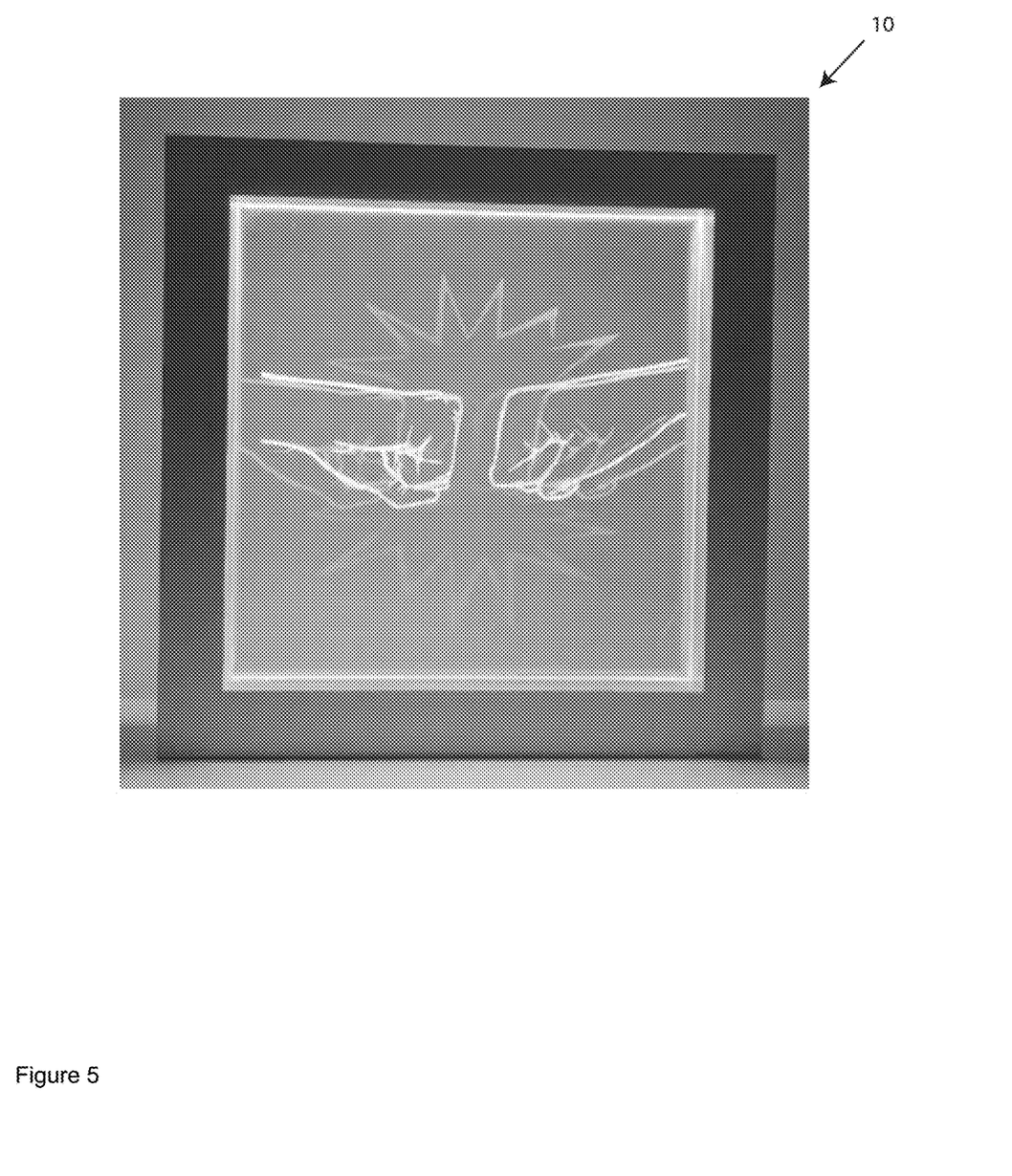
FIG. 5 of the drawings is a perspective view of a lighting assembly, in accordance with the present invention, shown in a second-on position ($2^{nd}$ substrate illumination only by a secondary light source)
Figure 6:
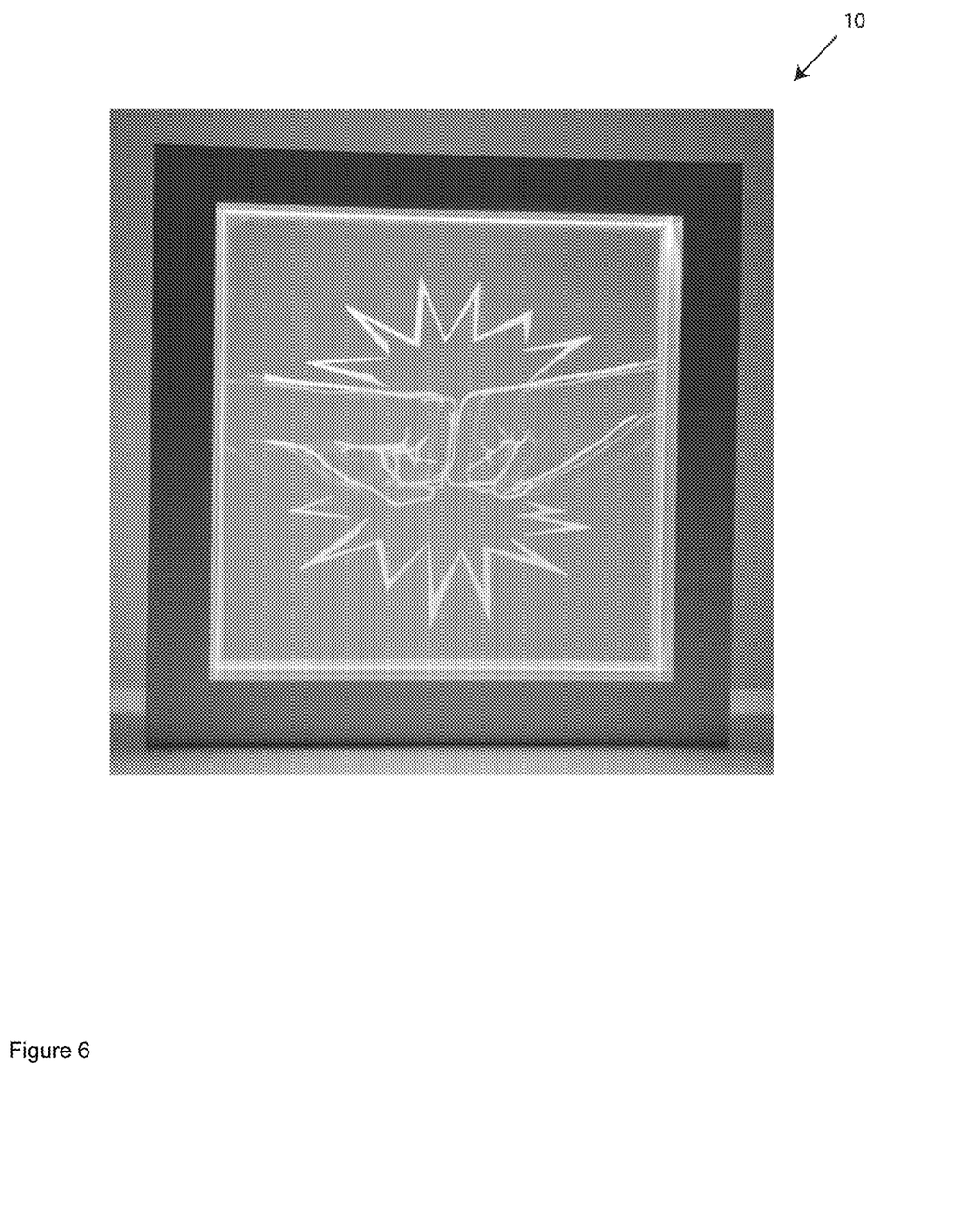
FIG. 6 of the drawings is a perspective view of a lighting assembly, in accordance with the present invention, shown in a third-on position ($3^{rd}$ substrate illumination only by a tertiary light source)

As is best shown in FIG. 3, housing/containment subassembly 12 preferably comprises one or more sidewalls 16 having inner surfaces and outer surfaces, top wall 18 having an inner surface and an outer surface, and bottom wall 20 having an inner surface and an outer surface. Sidewalls 16, top wall 18 and bottom wall 20 are preferably spaced-apart from each other to define an internal chamber 22 therebetween.

In accordance with the present invention, housing/containment sub-assembly 12 preferably comprises a body fabricated from a metal, a metal alloy, a natural resin, a synthetic resin, a plastic, a composite, wood, and/or combinations thereof.

Referring once again to FIGS. 1-3, containment sub-assembly 12 preferably includes a front sidewall, a rear sidewall, a left sidewall, and a right sidewall.

Figure 1:
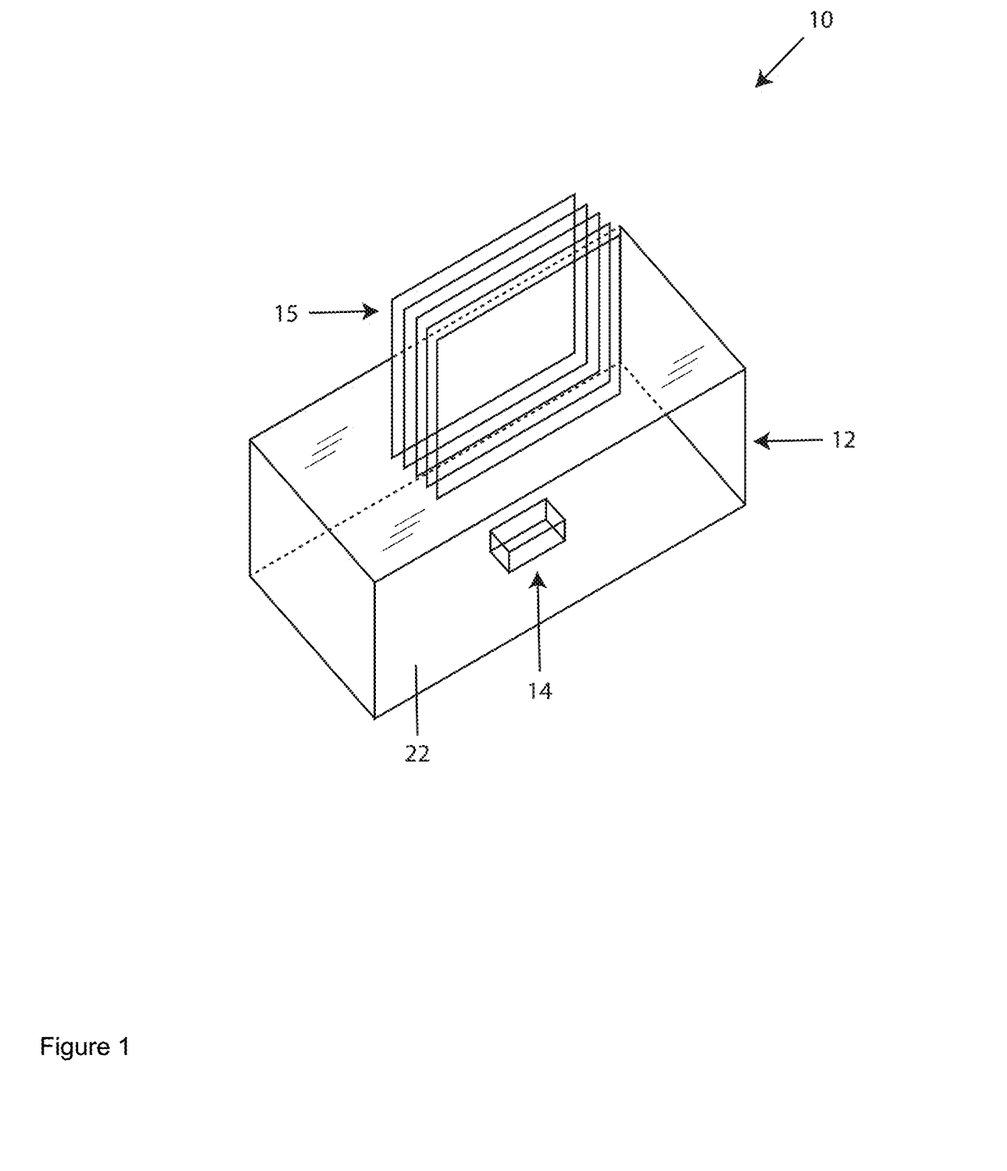
FIG. 1 of the drawings is a perspective view of a lighting assembly, in accordance with the present invention, showing a containment sub-assembly or housing/frame and a representation of a display sub-assembly.
Figure 2:
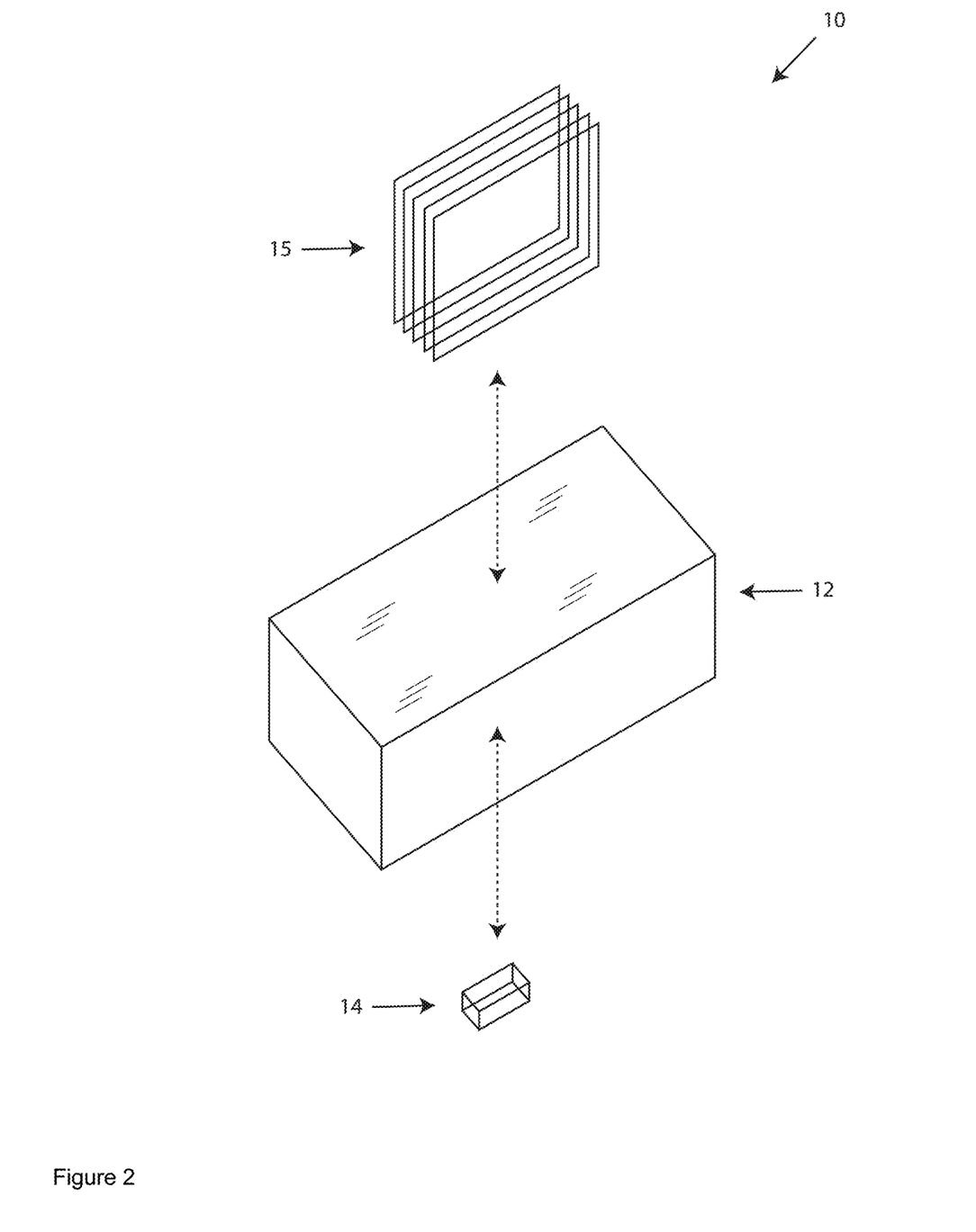
FIG. 2 of the drawings is an exploded perspective view of a lighting assembly, in accordance with the present invention, showing a containment sub-assembly or housing/frame and a representation of a display sub-assembly.

In accordance with the present invention, containment sub-assembly 12 preferably comprises the general geometry of a cube, a cuboid, a tetrahedron, a pyramid, a square pyramid, a hexagonal pyramid, a prism, a triangular prism, a pentagonal prism, a hexagonal prism, an octahedron, a dodecahedron, an icosahedron, a cylinder, a cone, a sphere, a polygon, and/or an ellipsoid.

Figure 7:
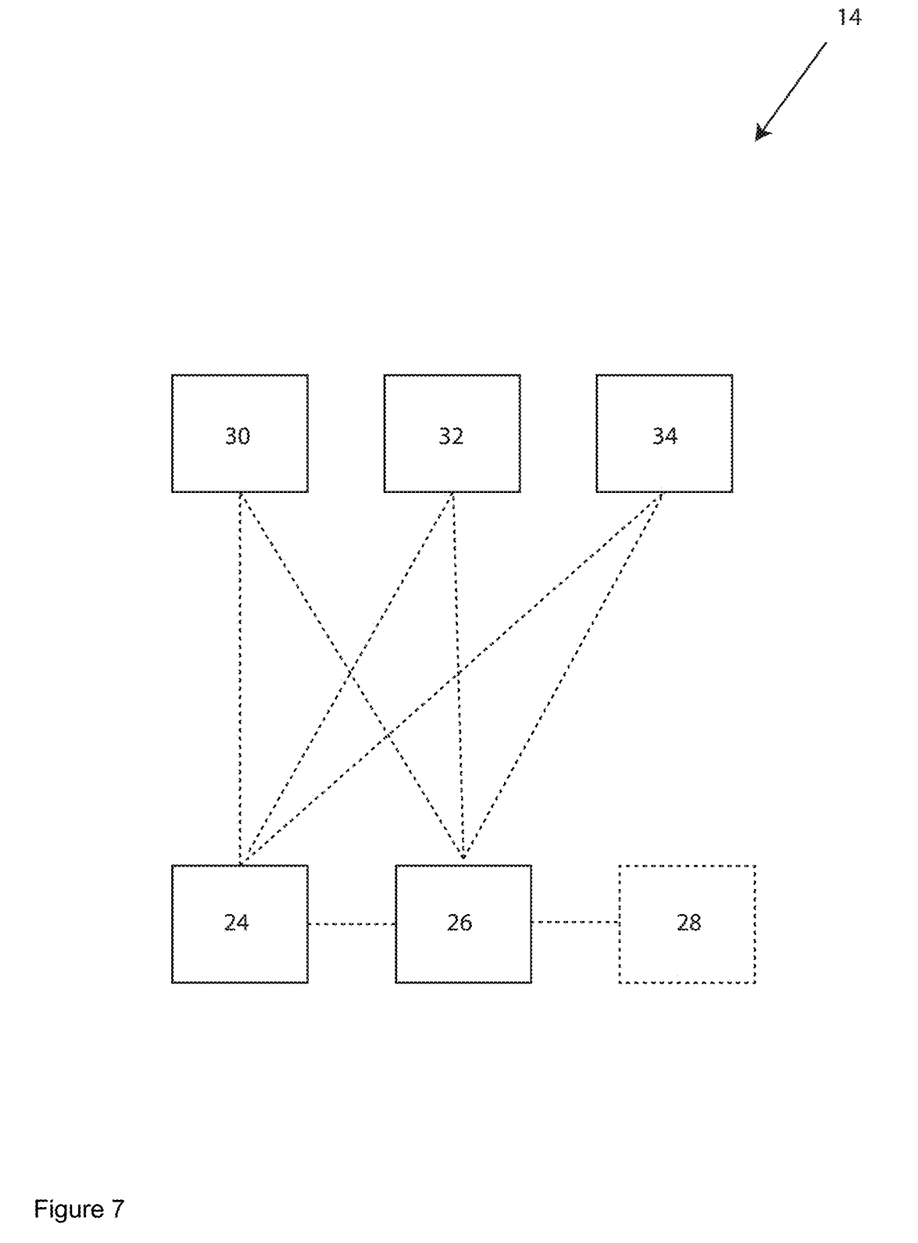
FIG. 7 of the drawings is schematic representation of an electronics sub-assembly for use in accordance with the present invention.

Referring now to FIG. 7, electronics sub-assembly 14 of lighting assembly 10 generally comprises energy source 24, circuit board/controller (e.g., printed circuit board) 26, optional mode switching component 28, primary light source 30, secondary light source 32, and tertiary light source 34.

Energy source 24 is preferably at least partially contained within internal chamber 22 of containment sub-assembly 12. Energy source 24 is also preferably in electrical communication with circuit board 26 and/or light sources 30, 32, and 34. Energy source 24 of the electronics sub-assembly preferably comprises, for example, an AC power supply, a DC power supply, an AC-DC power supply, a primary electrochemical cell, a secondary electrochemical cell, and/or a fuel cell.

Circuit board/controller 26 is preferably at least partially contained within internal chamber 22 of containment sub-assembly 12. Circuit board/controller 26 is preferably in electrical communication with energy source 24, optional mode switching component 28, and first, second, and third light sources 30, 32, and 34, respectively.

In a preferred embodiment of the present invention, circuit board/controller 26 of electronics sub-assembly 14 comprises one or more components, such as a battery, a bridge rectifier, a capacitor, a central processing unit, a communications port, a control board, a crystal, a diode, a fuse, a graphics board, an inductor, an input port, an integrated circuit, a microprocessor, a memory module, an oscillator, an output port, a potentiometer, a receiver, a relay, a resistor, a semiconductor, a switch, a timer, a transformer, a transistor, a tuner, a video processing unit, a wired communications hub, and/or a wireless communications hub.

Mode switching component 28 is optional and preferably associated with at least one of the sidewalls, the top wall, and the bottom wall of the containment assembly. Mode switching component 28 is preferably in electrical communication with circuit board/controller 26. In one embodiment of the present invention, mode switching component 28 comprises at least one of a pushbutton switch, a toggle switch, a selector switch, a proximity switch, a pressure switch, a conductivity switch, and a tactile sensor/switch.

Primary, secondary and tertiary light sources 30, 32, and 34, respectively, of electronics sub-assembly 14 are preferably positioned at least partially within internal chamber 22 of containment sub-assembly 12. The light sources are preferably in electrical communication with energy source 24 and/or circuit board/controller 26.

In accordance with the present invention, light sources 30, 32, and 34 preferably comprise one or more light-emitting diodes, one or more organic light-emitting diodes, and/or one or more tri-color (RGB) light-emitting diodes.

In accordance with the present invention, light sources 30, 32, and 34 may alternatively comprise an incandescent bulb, a tungsten-halogen bulb, a xenon bulb, a fluorescent bulb, a compact fluorescent lamp, a high-intensity discharge bulb and/or an electroconductive, lightable paint and/or material.

In another embodiment of the present invention, electronics sub-assembly 14 further comprises one or more of a secondary energy source, a secondary light source, a secondary user interface, a secondary circuit board, a secondary speaker, a vibration mechanism, a white noise generator, a thermo sensor, a tactile sensor, and/or a display—all of which are preferably in electrical communication with circuit board/controller 26. Preferably, the display is adapted to display at least one of alpha-numeric content, temperature, time, image and/or graphic.

Figure 8:
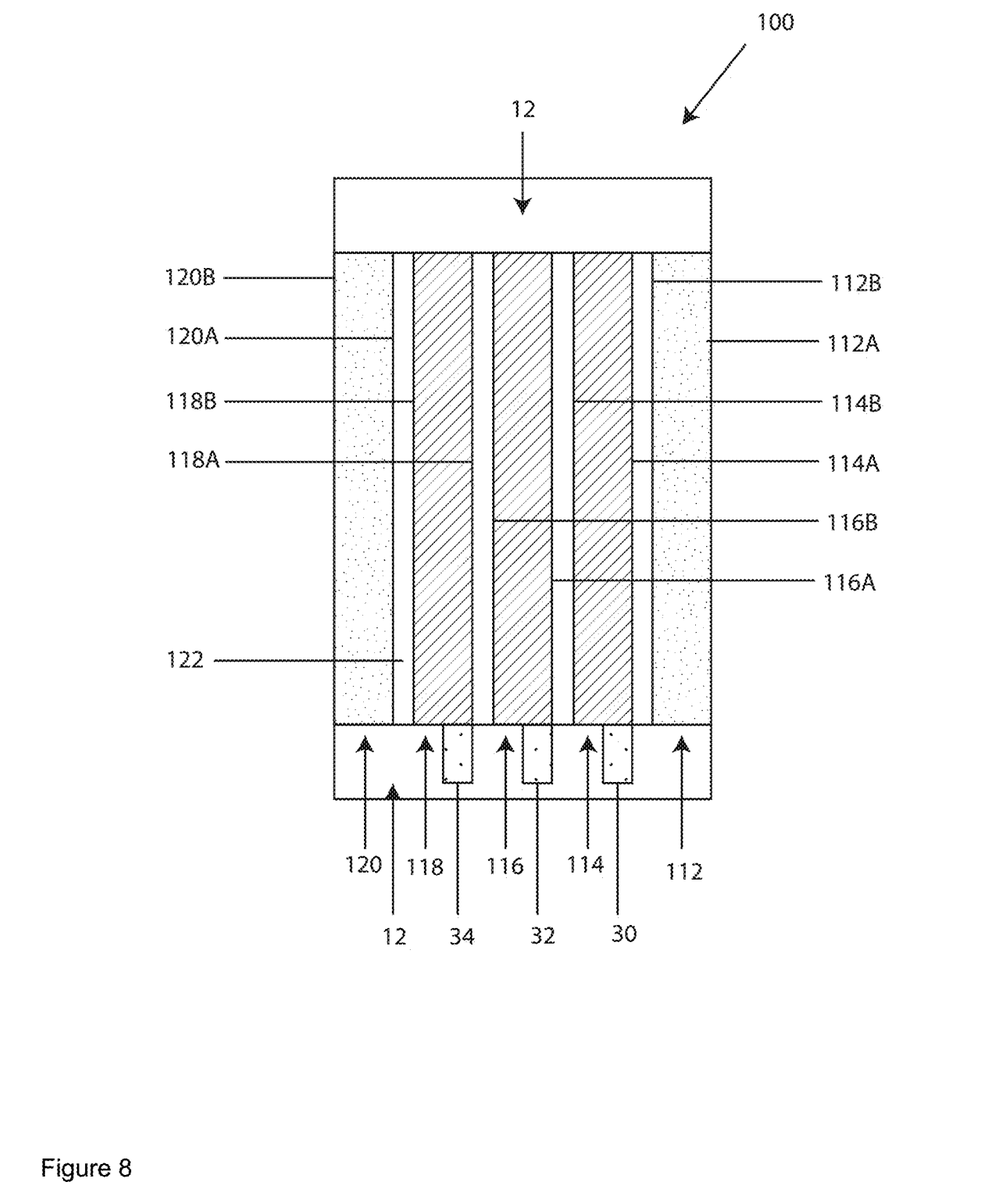
FIG. 8 of the drawings is a cross-sectional schematic representation of a display sub-assembly fabricated in accordance with the present invention.

As is best shown in FIGS. 8-9, primary light source 30, secondary light source 32, and tertiary light source 34 of electronics sub-assembly 14 controllably illuminate etched portions 124 of substrates of the display sub-assembly. Display sub-assembly 15 generally comprises optional front protective cover or first substantially transparent substrate 112 having front surface 112A and rear surface 112B, second substantially substrate 114 having front surface 114A and rear surface 114B, third substantially substrate 116 having front surface 116A and rear surface 116B, fourth substantially substrate 118 having front surface 118A and rear surface 118B, and optional rear protective cover or fifth substantially substrate 120 having front surface 120A and rear surface 120B. Substrates 112, 114, 116, 118, and 120 are preferably maintained in a generally parallel, spaced-apart manner to define chamber 122 positioned therebetween.

Primary light source 30 is preferably positioned proximate second substrate 114 and illuminates the same during normal operation. Secondary light source 32 is preferably positioned proximate third substrate 116 and illuminates the same during normal operation. Tertiary light source 34 is preferably positioned proximate fourth substrate 118 and illuminates the same during normal operation.

Transparent substrates 112-120 may be fabricated from any material that is transparent and has sufficient strength to be able to operate in the environmental conditions to which the assembly will be exposed. Substrates 112-120 may comprise any type of borosilicate glass, soda lime glass, float glass, or any one of a number of other materials, such as, for example, MYLAR®, polyvinylidene chloride, polyvinylidene halides, such as polyvinylidene fluoride, a polymer or plastic, such as cyclic olefin copolymers like Topas® available from Ticona, LLC of Summitt, N.J., that is transparent in the visible region of the electromagnetic spectrum. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, lighting assemblies of the present invention can be, during normal operation, exposed to extreme temperature variation, as well as substantial UV radiation, emanating primarily from the sun.

Substrates 112-120 are preferably fabricated from a sheet of glass having a thickness ranging from approximately 0.5 millimeters (mm) to approximately 12.7 mm, and more preferably less than approximately 1.0 mm for certain low weight applications.

As is best shown in FIG. 9, substrates 114, 116 and 118 include a surface that has been etched (mechanically, chemically, or otherwise) and will also have sufficient strength and be able to operate in the environmental conditions to which the device will be exposed. The etched regions of the substrates cooperatively interact to provide the motion effect through enhanced reflection of the associated light source. It will be understood that substrates 112-120 can optionally be tempered, heat strengthened, and/or chemically strengthened, prior to or subsequent to being etched.

Additionally, substrates 112-120 may be treated or coated as is described in U.S. Pat. No. 6,239,898 entitled "Electrochromic Structures," U.S. Pat. No. 6,193,378 entitled "Electrochromic Device Having A Self-Cleaning Hydrophilic Coating," and U.S. Pat. No. 6,816,297 entitled "Electrochromic Mirror Having A Self-Cleaning Hydrophilic Coating," the disclosures of which are hereby incorporated herein by reference in their entirety. Other treatments, such as anti-reflectance coatings, hydrophilic coatings, low-E coatings, and UV-blocking layers are also contemplated for use in accordance with the present invention. It will be understood that such coatings may be associated with substrates 112 and/or 114 in this as well as other embodiments.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A lighting assembly adapted for placement upon an article of furniture and/or securement to a wall, comprising:
    a housing sub-assembly, wherein the housing sub-assembly comprises:
        at least one sidewall having an inner surface and an outer surface;
        a top wall having an inner surface and an outer surface;
        a bottom wall having an inner surface and an outer surface; and
        wherein the at least one sidewall, the top wall, and the bottom wall are in a spaced-apart relationship to define an internal chamber therebetween;
    an electronics sub-assembly, wherein the electronics sub-assembly comprises:
        an energy source;
        a circuit board; and
        a primary light source, a secondary light source, and a tertiary light source; and
    a display sub-assembly, wherein the display sub-assembly comprises a first substrate, a second substrate, and a third substrate, wherein the substrates cooperatively interact to provide one or more lighted motion effects, and wherein the circuit board is positioned below the display sub-assembly, and wherein at least a portion of the display sub-assembly is positioned above the outer surface of the top wall of the housing sub-assembly.

2. The lighting assembly according to claim 1, wherein when in an off mode the primary light source, the secondary light source, and the tertiary light source are off, wherein when in a first-on mode the primary light source is on and the secondary and tertiary light sources are off, wherein when in a second-on mode the primary and tertiary light sources are off and the secondary light source is on, and wherein when in a third-on mode the primary and secondary light sources are off and the tertiary light source is on.

3. The lighting assembly according to claim 1, wherein the at least one sidewall of the housing sub-assembly comprises a front sidewall, a rear sidewall, a left sidewall, and a right sidewall.

4. The lighting assembly according to claim 1, wherein the housing sub-assembly comprises the geometry of at least one of a cube, a cuboid, a tetrahedron, a pyramid, a square pyramid, a hexagonal pyramid, a prism, a triangular prism, a pentagonal prism, a hexagonal prism, an octahedron, a dodecahedron, an icosahedron, a cylinder, a cone, a polygon, a sphere, and an ellipsoid.

5. The lighting assembly according to claim 1, wherein the energy source of the electronics sub-assembly comprises at least one of an AC power supply, a DC power supply, an AC-DC power supply, a primary electrochemical cell, a secondary electrochemical cell, and a fuel cell.

6. The lighting assembly according to claim 1, wherein the circuit board of the electronics sub-assembly comprises at least one of a battery, a bridge rectifier, a capacitor, a central processing unit, a communications port, a control board, a crystal, a diode, a fuse, a graphics board, an inductor, an input port, an integrated circuit, a microprocessor, a memory module, an oscillator, an output port, a potentiometer, a receiver, a relay, a resistor, a semiconductor, a transformer, a timer, a transistor, a tuner, a video processing unit, a wired communications hub, and a wireless communications hub.

7. The lighting assembly according to claim 1, wherein the display sub-assembly comprises:
   a first substantially transparent substrate having an outer surface and an inner surface;
   a second substantially transparent substrate having an outer surface and an inner surface;
   a third substantially transparent substrate having an outer surface and an inner surface; and
   wherein at least a portion of the inner and/or outer surfaces of each one of the first, second, and third substrates are etched so as to provide one or more lighted motion effects.

8. The lighting assembly according to claim 1, wherein the primary, secondary, and tertiary light sources independently comprise at least one of a light-emitting diode, an organic light-emitting diode, a tri-color (RGB) light-emitting diode, an incandescent bulb, a tungsten-halogen bulb, a xenon bulb, a fluorescent bulb, a compact fluorescent lamp, a high-intensity discharge bulb, and an electroconductive, lightable paint/material.

9. The lighting assembly according to claim 1, wherein the energy source is at least partially contained within the internal chamber of the housing sub-assembly, and wherein the energy source is in electrical communication with at least one of the circuit board, the primary light source, the secondary light source, and the tertiary light source.

10. The lighting assembly according to claim 1, wherein the circuit board is at least partially contained within the internal chamber of the housing sub-assembly, and wherein the circuit board is in electrical communication with at least one of the energy source, the primary light source, the secondary light source, and the tertiary light source.

11. The lighting assembly according to claim 1, wherein the primary light source, the secondary light source, and the tertiary light source are at least partially contained within the internal chamber of the housing sub-assembly, and wherein the primary light source, the secondary light source, and the tertiary light source are in electrical communication with at least one of the energy source and the circuit board.

* * * * *